Patented Apr. 1, 1941

2,236,546

UNITED STATES PATENT OFFICE

2,236,546

HEAT SEALABLE MOISTUREPROOFING COMPOSITION

James A. Mitchell, Kenmore, N. Y., assignor to E. I. du Pont de Nemours & Company, Wilmington, Del., a corporation of Delaware No Drawing. Application June 1, 1939, Serial No. 276,802

28 Claims. (Cl. 91—68)

This invention relates to the moistureproofing of films of regenerated cellulose and the like. It especially appertains to moistureproofing coating compositions giving heat sealable sheet wrapping material.

The coating of regenerated cellulose film to produce moistureproof wrapping material is already known, being described in U. S. Patent No. 1,737,187. In accordance with this disclosure, moistureproofness may be obtained by applying to the regenerated cellulose sheet a composition comprising a cellulosic film forming material such as cellulose nitrate, a solvent therefor such as an organic liquid, a wax or wax-like moistureproofing material such as paraffin, a plasticizer, and a blending agent for the film former and moistureproofing agent. In many instances, the blending agent is a resin, and in such case, in addition to its blending characteristics, it may also have certain film-forming characteristics. In the case of certain resins, more or less plasticizing action on the cellulose derivative film former of the moistureproofing composition is exercised by the resin.

Films coated with moistureproofing compositions are used to package many articles of commerce. One of the commonest and simplest methods for sealing such packages (so that the contents are completely enclosed) is merely by means of heat and pressure. The moistureproofed transparent regenerated cellulose film produced in the past possessed to a certain degree the characteristic of being sealable by the application of heat and pressure, but not to the extent of being completely satisfactory commercially.

Moistureproofing coating compositions employing nitrocelluloses of low nitrogen content as film-forming constituents are disclosed in U. S. A. Patent 1,997,583 (Hitt). Upon the application of heat and pressure to such moistureproofing compositions, an adhesive bond of fair strength is obtained. Improved heat sealability is also obtained by employing selected plasticizers as disclosed in U. S. A. Patent No. 2,079,379 (Mitchell). The strength of the heat seal bond was a function of the plasticizer used in the coating composition.

While in the past adhesive bonds of some considerable strength have been obtained by the application of heat and pressure to such coating compositions, they have left much to be desired in the way of actual strength and permanence of such bonds. Because the head seals heretofore known were not acceptable in certain fields, the use of moistureproofed regenerated cellulose sheet material has been seriously retarded.

It was, therefore, an object of this invention to prepare highly satisfactory flexible and low cost compositions for use in moistureproofing a wrapping material. The provision of moistureproofing coating compositions which would secure sheets or materials coated therewith through the application of heat and pressure with much greater tenacity and permanence than had heretofore been achieved, was also an aim of the work described herein. A further object was to secure heat seal bonds of exceptional strength. A general advance in the art, and other objects which will appear hereinafter, were also contemplated.

It has now been found that a moistureproofing coating composition giving a moistureproofed sheet wrapping material having satisfactory heat sealability is obtained by incorporating a polyhydric alcohol ester of "Heet-Rex" acid. In general the newly discovered moistureproofing coating compositions comprise a film-forming nitrocellulose, a wax or wax-like moistureproofing agent, a plasticizer, the "Heet-Rex" resin and, optionally, other resins serving as blending agents for the nitrocellulose and the moistureproofing agent.

The term "Heet-Rex" acid is a neologism used to define a synthetic terpinene-maleic anhydride polybasic acid resin complex, comprising essentially 3-isopropyl-6-methyl-3:6-endo-ethylene-delta-4-tetrahydro-phthalic anhydride (see J. Ind. Eng. Chem., XXIX, 21). It has an acid number of approximately 530, a molecular weight of approximately 215, and a softening point of 40°–50° C.

From the following description and specific examples, in which are disclosed certain embodiments of the invention as well as details of what is believed to be the best mode for carrying out the invention, it will be apparent how the foregoing objects and related ends are accomplished. Parts are given by weight throughout the application.

Example I

| | | |
|---|---|---|
| Ethylene glycol "Heet-Rex" | parts | 15 |
| Paraffin wax, M. P. 60° C. | do | 3 |
| Dibutyl phthalate | do | 15 |
| Dicyclohexyl phthalate | do | 15 |
| 11.6% N Nitrocellulose | do | 52 |
| Ethyl acetate | do | 450 |
| Toluene | do | 245 |
| Ethyl alcohol | do | 35 |
| Permeability value | | 50 |
| Heat seal | | 165 |

If such resins as rosin, "modified rosin" (U S

Patent No. 2,017,866), damar, ester gum, hydrogenated rosin, ethylene glycol rosin, etc., are substituted for the "Heet-Rex" resin in this example, the heat seal bond strength is zero.

*Example II*

| | | |
|---|---|---|
| Ethylene-triethylene glycol "Heet-Rex" | parts | 15 |
| Paraffin wax, M. P. 60° C. | do | 3 |
| Dibutyl phthalate | do | 15 |
| Dicyclohexyl phthalate | do | 15 |
| 11.6% N Nitrocellulose | do | 52 |
| Ethyl acetate | do | 450 |
| Toluene | do | 245 |
| Ethyl alcohol | do | 35 |
| Permeability value | | 80 |
| Heat seal | | 140 |

If such resins as rosin, "modified rosin" (U. S. Patent No. 2,017,866), damar, ester gum, hydrogenated rosin, ethylene glycol rosin, etc., are substituted for the "Heet-Rex" resin in this example, the heat seal bond strength is zero.

*Example III*

| | | |
|---|---|---|
| Ethylene-triethylene glycol "Heet-Rex" | parts | 5 |
| Paraffin wax, M. P. 60° C. | do | 3 |
| Wax-free damar | do | 15 |
| Dibutyl phthalate | do | 13 |
| Dicyclohexyl phthalate | do | 27 |
| 11.4% N Nitrocellulose | do | 37 |
| Ethyl acetate | do | 450 |
| Toluene | do | 245 |
| Ethyl alcohol | do | 35 |
| Permeability value | | 15 |
| Heat seal | | 350 |

*Example IV*

| | | |
|---|---|---|
| Diethylene glycol "Heet-Rex" | parts | 8 |
| Paraffin wax, M. P. 60° C. | do | 3 |
| "Modified rosin" (U. S. Patent 2,017,866) | do | 7 |
| Dibutyl phthalate | do | 15.5 |
| Dicyclohexyl phthalate | do | 15.5 |
| 11% N Nitrocellulose | do | 51 |
| Ethyl acetate | do | 450 |
| Toluene | do | 245 |
| Ethyl alcohol | do | 35 |
| Permeability value | | 15 |
| Heat seal | | 150 |

When "Modified rosin" (U. S. Patent No. 2,017,866) is substituted for the "Heet-Rex" resin in this example, the permeability value of the coated regenerated cellulose sheet is 20 and the heat seal bond strength is zero.

*Example V*

| | | |
|---|---|---|
| Triethylene glycol "Heet-Rex" | parts | 8 |
| Paraffin wax, M. P. 60° C. | do | 3 |
| "Modified rosin" (U. S. Patent 2,017,866) | do | 7 |
| Dibutyl phthalate | do | 15.5 |
| Dicyclohexyl phthalate | do | 15.5 |
| 11% N Nitrocellulose | do | 51 |
| Ethyl acetate | do | 450 |
| Toluene | do | 245 |
| Ethyl alcohol | do | 35 |
| Permeability value | | 25 |
| Heat seal | | 210 |

When the "Heet-Rex" resin of this example is omitted and the plasticizer-nitrocellulose ratio maintained the same (i. e., when 17 parts of dibutyl phthalate, 17 parts dicyclohexyl phthalate and 56 parts of nitrocellulose are employed), the permeability value is 15 and the heat seal bond strength is zero.

*Example VI*

| | | |
|---|---|---|
| Ethylene - diethylene - triethylene glycol "Heet-Rex" ("Heet-Rex" acid co-esterified with these glycols) | parts | 8 |
| Paraffin wax, M. P. 60° C. | do | 3 |
| "Modified rosin" (U. S. Patent 2,017,866) | do | 7 |
| Dibutyl phthalate | do | 15.5 |
| Dicyclohexyl phthalate | do | 15.5 |
| 11% N Nitrocellulose | do | 51 |
| Ethyl acetate | do | 450 |
| Toluene | do | 245 |
| Ethyl alcohol | do | 35 |
| Permeability value | | 20 |
| Heat seal | | 185 |

*Example VII*

| | | |
|---|---|---|
| Glycerol "Heet-Rex" | parts | 8 |
| Paraffin wax, M. P. 60° C. | do | 3 |
| "Modified rosin" (U. S. Patent 2,017,866) | do | 7 |
| Dibutyl phthalate | do | 15.5 |
| Dicyclohexyl phthalate | do | 15.5 |
| 11% N Nitrocellulose | do | 51 |
| Ethyl acetate | do | 450 |
| Toluene | do | 245 |
| Ethyl alcohol | do | 35 |
| Permeability value | | 30 |
| Heat seal | | 175 |

*Example VIII*

| | | |
|---|---|---|
| Ethylene glycol "Heet-Rex" | parts | 4 |
| Triethylene glycol "Heet-Rex" | do | 4 |
| Paraffin wax, M. P. 60° C. | do | 3 |
| "Modified rosin" (U. S. Patent 2,017,866) | do | 7 |
| Dicyclohexyl phthalate | do | 15.5 |
| 11% N Nitrocellulose | do | 51 |
| Dibutyl phthalate | do | 15.5 |
| Ethyl acetate | do | 450 |
| Toluene | do | 245 |
| Ethyl alcohol | do | 35 |
| Permeability value | | 25 |
| Heat seal | | 180 |

*Example IX*

| | | |
|---|---|---|
| Diethylene glycol "Heet-Rex" | parts | 10.0 |
| Paraffin wax, M. P. 60° C. | do | 2.66 |
| Wax free damar | do | 7.44 |
| Dibutyl phthalate | do | 32.6 |
| 11.4% N Nitrocellulose | do | 47.3 |
| Ethyl acetate | do | 423 |
| Toluene | do | 219 |
| Ethyl alcohol | do | 88 |
| Permeability value | | 5 |
| Heat seal | | 240 |

This example can advantageously be compared with Example I in U. S. A. Patent No. 1,997,583. The nitrocellulose-plasticizer ratio is the same in both instances. According to the patent, 36.7 parts of dibutyl phthalate and 53.2 parts of nitrocellulose are employed. In the example of the patent the permeability value is 10 and the heat seal bond strength only 135.

Example X

| | | |
|---|---|---|
| Ethylene-triethylene glycol "Heet-Rex" | parts | 5.0 |
| Paraffin wax, M. P. 60° C | do | 2.6 |
| Wax-free damar | do | 2.5 |
| Dibutyl phthalate | do | 10.0 |
| Dicyclohexyl phthalate | do | 30.0 |
| 11.4% N Nitrocellulose | do | 49.9 |
| Ethyl acetate | do | 431 |
| Toluene | do | 241 |
| Ethyl alcohol | do | 58 |
| Permeability value | | 5 |
| Heat seal | | 210 |

This example can advantageously be compared with Example IV of U. S. A. Patent No. 2,079,379. In the above example a portion of the damar (of the patented example) has been replaced with the "Heet-Rex" resin, that is to say, in the patented example 7.5 parts of damar were used. In the patented example the permeability value was also 5, but the heat seal bond strength was only 155.

In the above examples the coating compositions were applied to both sides of regenerated cellulose film 0.0009 inch thick, said film being softened with 15% glycerol, and the volatile constituents or solvents of the coating composition removed, in such a manner as to leave a coating 0.00004 inch thick on each side of the film. Such coating compositions, in addition to giving heat seal bonds of high strength, were exceptionally moistureproof, as indicated by the figures given.

Ordinarily nitrocellulose having a nitrogen content of 11% to 12% is used as a film former. Products falling within the wider range of 10.5% to 12.5% are, however, especially desirable in many cases.

Generally speaking, this invention pertains to the provision of moistureproofing coating compositions comprising "Heet-Rex" esters in combination with nitrocellulose and moistureproofing agents such as waxes or wax-like materials. Such compositions may also include plasticizing agents, drying or non-drying oils, additional resinous materials of either natural or synthetic varieties (particularly those giving a better blending effect than the "Heet-Rex" esters), coloring agents either as dyes or pigments, or other modifying agents, according to the type of coating composition preferred. The proportions of the ingredients may be varied within wide limits, depending on the properties desired in the finished coating. The total film constituents, for convenience referred to as total solids, may be varied according to the film to be obtained; the proportion of resinous material may determine the hardness, adhesion, and gloss; the plasticizer will assist in obtaining suitable flexibility, and other constituents will affect other properties. Ordinarily, the film former constitutes 30% to 70%, the moistureproofing agent 0.5% to 10% and the plasticizer 0% to 50% of the total solids. The proportions of the ingredients to each other is usually in the ratios:

| | |
|---|---|
| Moistureproofing agent to blending agent | 1:1.7 to 1:14 |
| Plasticizer to film forming agent | 1:1.25 to 1:5 |
| Blending agent to film forming agent | 1:1.2 to 1:10 |

The coating composition also includes solvents and solvent mixtures which are adapted to the purposes of the coating composition and to the method of applying the coating composition to the desired base, and can be adjusted in accordance with the practices of one skilled in the art and the teachings of the earlier patents in this field.

For the practice of this invention, nitrocellulose, at least in predominating proportions, is used as the film-forming material. Other film-forming materials, such as other cellulose derivatives or resins such as butyl methacrylate may be used in conjunction with nitrocellulose. Preferably the latter should constitute 50% or more of the film-forming ingredients.

Equivalent moistureproofing agents, plasticizers, other resinous materials, solvents, base sheets, methods of coating, and the proportions of the ingredients are given in U. S. A. Patent No. 2,147,180 (Ubben), particularly at page 4, column 2, line 21 to page 5, column 1, line 20 and page 5, column 1, line 45 to page 5, column 2, line 14.

In the past it has been customary to employ natural or synthetic resins such as damar, copal, kauri, polybasic acid-polyhydric alcohol resinous condensation products as the resinous constituent. These may be used with or without the addition of modifying agents, such as monohydric alcohols, monobasic acids, drying oils, non-drying oils, etc., in the present invention.

The "Heet-Rex" esters which have been found to give this valuable improvement in the heat seal bond strength are the glycol and glycerol esters of "Heet-Rex" acid. The ethylene glycol "Heet-Rex," diethylene glycol "Heet-Rex," triethylene glycol "Heet-Rex," glycerol "Heet-Rex," or co-esterified products using two or more such polyhydric alcohols, are especially effective. Higher ethylene glycols, such as tetraethylene glycol, or other polyhydric alcohols, for example the alkylene polyhydric alcohols such as n-butylene glycol, isobutylene glycol and propylene glycol, may be used in the preparation of suitable esters. It is not necessary that the "Heet-Rex" acid be completely esterified, since varying amounts of the alcoholic material may be used in preparing resin-producing products with different acid numbers. In promoting heat seal, "Heet-Rex" esters are effective in the range from 1% to 30% of the solid components. Everything considered, including such blending effects as these esters may furnish, the preferred range is from 3% to 30%. In the majority of cases the quantities used fall within the narrower range of 5% to 30%.

The term "modified rosin" is employed to define the rosin claimed in U. S. Patent No. 2,017,866. This "modified rosin" is characterized generally by properties similar to those of rosin, but with the difference that it has a molecular weight within the range of 5% to 400% greater than ordinary rosin in its pure state; that it has a melting point, as determined by the capillary tube method, above 80° C. and higher than the melting point of pure abietic acid and of purified rosin when in the resinous state; that it is substantially free from combined sulfur and hardening substances held in combination; that it has an iodine value lower than that of pure abietic acid; and that it has a molecular weight higher than that of pure abietic acid.

Moistureproofness, moistureproofing coating compositions, and transparent moistureproofing sheet wrapping material and related terms, are defined in U. S. A. Patent No. 2,147,180 (Ubben). In the interest of brevity, the definitions are not repeated here. The terms involved are used in this application in accordance with such definitions.

For the purpose of comparison and definition, the following tests have been used to measure the strength of the heat seal bond. Two strips of the coated material 1½ inches wide are superimposed one on the other so that opposite faces of the film are in contact. A seal is made across the width of the material at one end by placing the film on a metal plate heated to 130° C. and rolling thereover a roller ⅝ inch wide, weighted to 650 grams. The two strips so sealed are opened at the free ends and placed in a stretching device such as a Suter testing machine, by gripping each end of the sheet in suitable clamps, one of which is fixed while the other is moved away at a constant speed of 12 inches per minute. The force in grams required to pull the sheets apart is taken as a measure of the heat seal bond strength.

The strength of the heat seal bond obtained with the transparent moistureproof coatings of this invention are superior to any heretofore obtained. Such a characteristic fulfills a long-felt need in the packaging art. For example, it has recently been found advantageous to package a large number of commodities such as nuts, grains, breakfast food, etc., in transparent bags in order that they may be freely handled and inspected in a sanitary manner. During handling and shipping these bags are subjected to severe strains which often cause rupture with consequent spilling of the contents. The transparent materials, such as regenerated cellulose, used in these bags are in general quite tough and durable, and it often happens that the ultimate strength of the bags is more a function of the strength of the heat seal bonds at the joints than of the strength of the transparent material itself. It will, therefore, be readily appreciated that a means of providing an exceptionally strong heat seal bond in the production of such bags constitutes a valuable contribution to the art.

The remarkable and surprising discovery has been made that the addition of the "Heet-Rex" esters of this invention to transparent moistureproof nitrocellulose coating compositions such as those generally used for coating transparent wrapping material, improves the strength of the heat seal bond obtained therewith to a marked degree. It was, furthermore, surprising that this improvement of the heat seal bond strength should occur even when these materials were added to compositions which in the past have been considered as providing heat seal bonds of exceptional strength.

While it is advantageous that overlapping sections of such film may be stuck or sealed together by the application of pressure and heat, it is not desirable that this should take place at low temperatures, such as room temperature or temperatures slightly higher which may be encountered in the storage of film or articles wrapped therein, or in packaging operations, with the exception of those (operations) designed to form such heat seal. That the temperature required for such heat sealing should be quite high and that no tackiness should exist below this temperature, are desiderata (practically amounting to requirements) which this invention has been found to supply.

Not only is it desirable that the coating on such sheet material (tissue) be non-tacky and not stick to other sheets or objects with which it may come in contact, but also that it adhere firmly to the film upon which it is deposited. This will be obvious because the coating tends to become loose and peel off, and that section of the film which loses its coating will no longer give adequate protection against the escape or entry of vapors. In addition, the material thus lost from the surface of the film may foul apparatus (such as automatic wrapping machinery), giving rise to the spoilage of additional material, loss of time and operation, and expense of extra labor. The coating compositions of this invention adhere to the film with great tenacity, thus minimizing these evils.

Sheets or films of regenerated cellulose coated with moistureproofing compositions of this invention also possess good surface, so that adjacent sheets will slip properly for handling and will not smear or adhere to one another when stacked.

As many apparently widely different embodiments of this invention may be made without departing from the spirit and scope thereof, it is to be understood that I do not limit myself to the specific embodiments thereof except as defined in the appended claims.

I claim:

1. A transparent, moistureproof, heat sealable sheet wrapping material comprising a regenerated cellulose film coated with a moistureproofing composition, the solids of said coating comprising essentially film former consisting predominately of nitrocellulose, wax moistureproofing agent, plasticizer, and polyhydric alcohol ester of "Heet-Rex" acid, said "Heet-Rex" acid being a synthetic terpinene-maleic anhydride polybasic acid resin complex having an acid number of approximately 530, a molecular weight of approximately 215, a softening point of 40°–50° C., and comprising essentially 3-isopropyl-6-methyl-3:6-endo-ethylene-delta-4 - tetrahydrophthalic anhydride.

2. A transparent, moistureproof, heat sealable sheet wrapping material comprising a regenerated cellulose film coated with a moistureproofing composition, the solids of said coating comprising essentially film former consisting predominately of nitrocellulose, wax moistureproofing agent, plasticizer, resin blending agent, and polyhydric alcohol ester of "Heet-Rex" acid, said "Heet-Rex" acid being a synthetic terpinene-maleic anhydride polybasic acid resin complex having an acid number of approximately 530, a molecular weight of approximately 215, a softening point of 40°–50° C., and comprising essentially 3-isopropyl-6-methyl - 3:6 - endo-ethylene-delta-4-tetrahydro-phthalic anhydride.

3. A transparent, moistureproof, heat sealable sheet wrapping material comprising a regenerated cellulose film coated with a moistureproofing composition, the solids of which comprise essentially film former consisting predominately of nitrocellulose, wax moistureproofing agent, plasticizer, and polyhydric alcohol ester of "Heet-Rex'" acid from the group consisting of "Heet-Rex" acid esterified with one or more of ethylene glycol, di-ethylene glycol, tri-ethylene glycol, tetra-ethylene glycol, propylene glycol, butylene glycol and glycerol, said "Heet-Rex" acid being a synthetic terpinene-maleic anhydride polybasic acid resin complex having an acid number of approximately 530, a molecular weight of approximately 215, a softening point of 40°–50° C., and comprising essentially 3-isopropyl-6-methyl-3:6-endo-ethylene-delta-4-tetrahydro-phthalic anhydride.

4. A transparent, moistureproof, heat sealable sheet wrapping material comprising a regenerated cellulose film coated with a moistureproofing composition comprising solid film former consisting predominately of nitrocellulose 30% to 70% of the total solids, wax moistureproofing agent 0.5% to 10% of the total solids, and polyhydric alcohol ester of "Heet-Rex" acid sufficient to blend the film former and wax moistureproofing agent, said "Heet-Rex" acid being a synthetic terpinene-maleic anhydride polybasic acid resin complex having an acid number of approximately 530, a molecular weight of approximately 215, a softening point of 40°–50° C., and comprising essentially 3-isopropyl-6-methyl-3:6-endo-ethylene-delta-4-tetrahydro-phthalic anhydride.

5. A transparent, moistureproof, heat sealable sheet wrapping material comprising a regenerated cellulose film coated with a moistureproofing composition, the solids of which comprise essentially film former consisting predominately of nitrocellulose, wax moistureproofing agent, plasticizer, and polyhydric alcohol ester of "Heet-Rex" acid, the ratio of wax moistureproofing agent to blending agent being in the range 1:1.7 to 1:14, the ratio of plasticizer to film former being in the range 1:1.25 to 1:5 and the ratio of resin blending agent to film former being in the range 1:1.2 to 1:10, said "Heet-Rex" acid being a synthetic terpinene-maleic anhydride polybasic acid resin complex having an acid number of approximately 530, a molecular weight of approximately 215, a softening point of 40°–50° C., and comprising essentially 3-isopropyl-6-methyl-3:6-endo-ethylene-delta-4-tetrahydro-phthalic anhydride.

6. A moistureproofing coating composition adapted to moistureproof regenerated cellulose film, said composition consisting of solids comprising essentially film former consisting predominately of nitrocellulose, wax moistureproofing agent and polyhydric alcohol ester of "Heet-Rex" acid blending agent and solvent, said "Heet-Rex" acid being a synthetic terpinene-maleic anhydride polybasic acid resin complex having an acid number of approximately 530, a molecular weight of approximately 215, a softening point of 40°–50° C., and comprising essentially 3-isopropyl-6-methyl-3:6-endo-ethylene-delta-4-tetrahydro-phthalic anhydride.

7. A moistureproofing coating composition adapted to moistureproof regenerated cellulose film, said composition consisting of solids comprising essentially film former consisting predominately of nitrocellulose, wax moistureproofing agent, plasticizer and polyhydric alcohol ester of "Heet-Rex" acid blending agent, and solvent, said "Heet-Rex" acid being a synthetic terpinene-maleic anhydride polybasic acid resin complex having an acid number of approximately 530, a molecular weight of approximately 215, a softening point of 40°–50° C., and comprising essentially 3-isopropyl-6-methyl-3:6-endo-ethylene-delta-4-tetrahydro-phthalic anhydride.

8. A moistureproofing coating composition adapted to moistureproof regenerated cellulose film, said composition consisting of solids comprising essentially film former consisting predominately of nitrocellulose, wax moistureproofing agent, plasticizer and polyhydric alcohol ester of "Heet-Rex" acid blending agent from the group consisting of "Heet-Rex" acid esterified with one or more of ethylene glycol, di-ethylene glycol, tri-ethylene glycol, tetra-ethylene glycol, propylene glycol, butylene glycol and glycerol, and solvent, said "Heet-Rex" acid being a synthetic terpinene-maleic anhydride polybasic acid resin complex having an acid number of approximately 530, a molecular weight of approximately 215, a softening point of 40°–50° C., and comprising essentially 3-isopropyl-6-methyl-3:6-endo-ethylene-delta-4-tetrahydro-phthalic anhydride.

9. A coating composition consisting of:

| | | |
|---|---|---|
| Ethylene-triethylene glycol "Heet-Rex" | parts | 5 |
| Paraffin wax, M. P. 60° C | do | 3 |
| Wax-free damar | do | 15 |
| Dibutyl phthalate | do | 13 |
| Dicyclohexyl phthalate | do | 27 |
| 11.4% N Nitrocellulose | do | 37 |
| Ethyl acetate | do | 450 |
| Toluene | do | 245 |
| Ethyl alcohol | do | 35 | said "Heet-Rex" acid being a synthetic terpinene-maleic anhydride polybasic acid resin complex having an acid number of approximately 530, a molecular weight of approximately 215, a softening point of 40°–50° C., and comprising essentially 3-isopropyl-6-methyl-3:6-endo-ethylene-delta-4-tetrahydro-phthalic anhydride.

10. A transparent, moistureproof, heat sealable sheet wrapping material consisting of a regenerated cellulose film having a surface moistureproofing coating consisting of:

| | | |
|---|---|---|
| Ethylene-triethylene glycol "Heet-Rex" | parts | 5 |
| Paraffin wax, M. P. 60° C | do | 3 |
| Wax-free damar | do | 15 |
| Dibutyl phthalate | do | 13 |
| Dicyclohexyl phthalate | do | 27 |
| 11.4% N Nitrocellulose | do | 37 | said "Heet-Rex" acid being a synthetic terpinene-maleic anhydride polybasic acid resin complex having an acid number of approximately 530, a molecular weight of approximately 215, a softening point of 40°–50° C., and comprising essentially 3-isopropyl-6-methyl-3:6-endo-ethylene-delta-4-tetrahydro-phthalic anhydride.

11. A transparent, moistureproof, heat sealable sheet wrapping material comprising a regenerated cellulose film coated with a moistureproofing composition, the total solids of the coating comprising essentially film former consisting predominately of nitrocellulose 30% to 70% of the total solids, wax moistureproofing agent 0.5% to 10% of the total solids, plasticizer less than 50% of the total solids, and polyhydric alcohol ester of "Heet-Rex" acid sufficient to blend the film former and wax moistureproofing agent, said "Heet-Rex" acid being a synthetic terpinene-maleic anhydride polybasic acid resin complex having an acid number of approximately 530, a molecular weight of approximately 215, a softening point of 40°–50° C., and comprising essentially 3-isopropyl-6-methyl-3:6-endo-ethylene-delta-4-tetrahydro-phthalic anhydride.

12. A transparent, moistureproof, heat sealable sheet wrapping material comprising a regenerated cellulose film coated with a moistureproofing composition, the total solids of the coating comprising essentially film former consisting predominately of nitrocellulose 30% to 70% of the total solids, wax moistureproofing agent 0.5% to 10% of the total solids, plasticizer less than 50% of the total solids, and 1% to 30% polyhydric alcohol ester of "Heet-Rex" acid, said "Heet-Rex" acid being a synthetic terpinene-maleic anhydride polybasic acid resin complex having an acid number of approximately 530, a molecular weight of approximately 215, a softening point of 40°–50° C., and comprising essentially 3-isopropyl-6-methyl-3:6-endo-ethylene-delta-4-tetrahydro-phthalic anhydride.

13. A transparent, moistureproof, heat sealable sheet wrapping material comprising a regenerated cellulose film coated with a moistureproofing composition the solids of the coating comprising essentially film former consisting predominately of nitrocellulose, wax moistureproofing agent, plasticizer, and 5% to 30%, based on the total solids, polyhydric alcohol ester of "Heet-Rex" acid, the ratio of wax moistureproofing agent to blending agent being in the range 1:1.7 to 1:14, the ratio of plasticizer to film former being in the range 1:1.25 to 1:5 and the ratio of resin blending agent to film former being in the range 1:1.2 to 1:10, said "Heet-Rex" acid being a synthetic terpinene-maleic anhydride polybasic acid resin complex having an acid number of approximately 530, a molecular weight of approximately 215, a softening point of 40°–50° C., and comprising essentially 3-isopropyl-6-methyl-3:6-endo-ethylene-delta-4-tetrahydro-phthalic anhydride.

14. A transparent, moistureproof, heat sealable sheet wrapping material comprising a regenerated cellulose film coated with a moistureproofing composition comprising essentially 10.5%–12.5% N cellulose nitrate film former, wax moistureproofing agent, plasticizer, and 3% to 30%, based on the total solids, polyhydric alcohol ester of "Heet-Rex" acid from the group consisting of "Heet-Rex" acid esterified with one or more of ethylene glycol, di-ethylene glycol, tri-ethylene glycol, tetra-ethylene glycol, propylene glycol, butylene glycol and glycerol, said "Heet-Rex" acid being a synthetic terpinene-maleic anhydride polybasic acid resin complex having an acid number of approximately 530, a molecular weight of approximately 215, a softening point of 40–50° C., and comprising essentially 3-isopropyl-6-methyl-3:6-endo-ethylene-delta-4-tetrahydro-phthalic anhydride.

15. A transparent, moistureproof, heat sealable sheet wrapping material comprising a regenerated cellulose film coated with a moistureproofing composition comprising essentially solid film former consisting predominately of nitrocellulose 30% to 70% of the total solids, wax moistureproofing agent 0.5% to 10% of the total solids, and polyhydric alcohol ester of "Heet-Rex" acid sufficient to blend the film former and wax moistureproofing agent, said "Heet-Rex" acid being a synthetic terpinene-maleic anhydride polybasic acid resin complex having an acid number of approximately 530, a molecular weight of approximately 215, a softening point of 40°–50° C., and comprising essentially 3-isopropyl-6-methyl-3:6-endo-ethylene-delta-4-tetrahydro-phthalic anhydride.

16. A transparent, moistureproof, heat sealable sheet wrapping material comprising a regenerated cellulose film coated with a moistureproofing composition, the solids of said coating comprising essentially film former consisting predominately of cellulosic film-forming material, moistureproofing agent, and polyhydric alcohol ester of "Heet-Rex" acid, said "Heet-Rex" acid being a synthetic terpinene-maleic anhydride polybasic acid resin complex having an acid number of approximately 530, a molecular weight of approximately 215, a softening point of 40°–50° C., and comprising essentially 3-isoproyl-6-methyl-3:6-endo-ethylene-delta-4-tetrahydro-phthalic anhydride.

17. The product of claim 1 when the film former is film-forming nitrocellulose.
18. The product of claim 2 when the film former is film-forming nitrocellulose.
19. The product of claim 3 when the film former is film-forming nitrocellulose.
20. The product of claim 15 when the film former is film-forming nitrocellulose.
21. The product of claim 5 when the film former is film-forming nitrocellulose.
22. The product of claim 11 when the film former is film-forming nitrocellulose.
23. The product of claim 12 when the film former is film-forming nitrocellulose.
24. The product of claim 13 when the film former is film-forming nitrocellulose.

25. A coating composition consisting of:

| | | |
|---|---|---|
| Triethylene glycol "Heet-Rex" | parts | 8 |
| Paraffin wax, M. P. 60° C | do | 3 |
| Modified rosin | do | 7 |
| Dibutyl phthalate | do | 15.5 |
| Dicyclohexyl phthalate | do | 15.5 |
| 11% N Nitrocellulose | do | 51 |
| Ethyl acetate | do | 450 |
| Toluene | do | 245 |
| Ethyl alcohol | do | 35 | said "Heet-Rex" acid being a synthetic terpinene-maleic anhydride polybasic acid resin complex having an acid number of approximately 530, a molecular weight of approximately 215, a softening point of 40°–50° C., and comprising essentially 3-isopropyl-6-methyl-3:6-endoethylene-delta-4-tetrahydro-phthalic anhydride, and said modified rosin being generally similar to rosin but with the difference that it has a molecular weight within the range of 5% to 400% greater than ordinary rosin in its pure state, that it has a melting point as determined by the capillary tube method above 80° C. and higher than the melting point of pure abietic acid and of purified rosin when in the resinous state, that it is substantially free from combined sulfur and hardening substances held in combination, that it has an iodine value lower than that of pure abietic acid, and that it has a molecular weight higher than that of pure abietic acid.

26. A transparent, moistureproof, heat sealable sheet wrapping material consisting of a regenerated cellulose film having a surface moistureproofing coating consisting of:

| | | |
|---|---|---|
| Triethylene glycol "Heet-Rex" | parts | 8 |
| Paraffin wax, M. P. 60° C | do | 3 |
| Modified rosin | do | 7 |
| Dibutyl phthalate | do | 15.5 |
| Dicyclohexyl phthalate | do | 15.5 |
| 11% N Nitrocellulose | do | 51 | said "Heet-Rex" acid being a synthetic terpinene-maleic anhydride polybasic acid resin complex having an acid number of approximately 530, a molecular weight of approximately 215, a softening point of 40°–50° C., and comprising essentially 3-isopropyl-6-methyl-3:6-endo-ethylene-delta-4-tetrahydro-phthalic anhydride, and said modified rosin being generally similar to rosin but with the difference that it has a molecular weight within the range of 5% to 400% greater than ordinary rosin in its pure state, that it has a melting point as determined by the capillary tube method above 80° C. and higher than the melting point of pure abietic acid and of purified rosin when in the resinous state, that it is substantially free from combined sulfur and hardening substances held in combination, that it has an iodine value lower than that of pure abietic acid, and that it has a molecular weight higher than that of pure abietic acid.

27. A coating composition consisting of:

| | |
|---|---|
| Ethylene - diethylene - triethylene glycol "Heet-Rex" ("Heet-Rex" acid co-esterified with these glycols)_____parts__ | 8 |
| Paraffin wax, M. P. 60° C_____do____ | 3 |
| Modified rosin_____do____ | 7 |
| Dibutyl phthalate_____do____ | 15.5 |
| Dicyclohexyl phthalate_____do____ | 15.5 |
| 11% N Nitrocellulose_____do____ | 51 |
| Ethyl acetate_____do____ | 450 |
| Toluene_____do____ | 245 |
| Ethyl alcohol_____do____ | 35 | said "Heet-Rex" acid being a synthetic terpinene-maleic anhydride polybasic acid resin complex having an acid number of approximately 530, a molecular weight of approximately 215, a softening point of 40°–50° C., and comprising essentially 3 - isopropyl-6-methyl-3:6-endo-ethylene-delta-4-tetrahydro-phthalic anhydride, and said modified rosin being generally similar to rosin but with the difference that it has a molecular weight within the range of 5% to 400% greater than ordinary rosin in its pure state, that it has a melting point as determined by the capillary tube method above 80° C. and higher than the melting point of pure abietic acid and of purified rosin when in the resinous state, that it is substantially free from combined sulfur and hardening substances held in combination, that it has an iodine value lower than that of pure abietic acid, and that it has a molecular weight higher than that of pure abietic acid.

28. A transparent, moistureproof, heat sealable sheet wrapping material consisting of a regenerated cellulose film having a surface moistureproofing coating consisting of:

| | |
|---|---|
| Ethylene - diethylene - triethylene glycol "Heet-Rex" ("Heet-Rex" acid co-esterified with these glycols)_____parts__ | 8 |
| Paraffin wax, M. P. 60° C_____do____ | 3 |
| Modified rosin_____do____ | 7 |
| Dibutyl phthalate_____do____ | 15.5 |
| Dicyclohexyl phthalate_____do____ | 15.5 |
| 11% N Nitrocellulose_____do____ | 51 | said "Heet-Rex" acid being a synthetic terpinene-maleic anhydride polybasic acid resin complex having an acid number of approximately 530, a molecular weight of approximately 215, a softening point of 40°–50° C., and comprising essentially 3 - isopropyl-6-methyl-3:6-endo-ethylene-delta-4-tetrahydro-phthalic anhydride, and said modified rosin being generally similar to rosin but with the difference that it has a molecular weight within the range of 5% to 400% greater than ordinary rosin in its pure state, that it has a melting point as determined by the capillary tube method above 80° C. and higher than the melting point of pure abietic acid and of purified rosin when in the resinous state, that it is substantially free from combined sulfur and hardening substances held in combination, that it has an iodine value lower than that of pure abietic acid, and that it has a molecular weight higher than that of pure abietic acid.

JAMES A. MITCHELL.